US009568347B2

(12) United States Patent
Drachmann (10) Patent No.: US 9,568,347 B2
(45) Date of Patent: Feb. 14, 2017

(54) ULTRASONIC FLOW METER INCLUDING A METER HOUSING INSERT HAVING TRANSDUCER RECESSES WITH SLANTED BOTTOM WALLS

(71) Applicant: Miitors ApS, Horsens (DK)

(72) Inventor: Jens Drachmann, Viby J (DK)

(73) Assignee: APATOR MIITORS APS (DK)

( * ) Notice: Subject to any disclaimer, the term of this patent is extended or adjusted under 35 U.S.C. 154(b) by 0 days.

(21) Appl. No.: 14/423,011

(22) PCT Filed: Aug. 22, 2013

(86) PCT No.: PCT/DK2013/050270
§ 371 (c)(1),
(2) Date: Feb. 20, 2015

(87) PCT Pub. No.: WO2014/029404
PCT Pub. Date: Feb. 27, 2014

(65) Prior Publication Data
US 2015/0211905 A1   Jul. 30, 2015

(30) Foreign Application Priority Data
Aug. 22, 2012 (DK) .................................. 2012 70496

(51) Int. Cl.
G01F 1/66 (2006.01)
H04R 31/00 (2006.01)

(52) U.S. Cl.
CPC .............. *G01F 1/662* (2013.01); *G01F 1/667* (2013.01); *H04R 31/006* (2013.01);
(Continued)

(58) Field of Classification Search
None
See application file for complete search history.

(56) References Cited

U.S. PATENT DOCUMENTS

| 400,331 A | 3/1889 | Graeser |
| 1,214,425 A | 1/1917 | Caston |

(Continued)

FOREIGN PATENT DOCUMENTS

| CN | 101153813 A | 4/2008 |
| CN | 201740552 U | 2/2011 |

(Continued)

OTHER PUBLICATIONS

Search Report from Danish Patent and Trademark Office Application No. PA 2012 70496 Completed: Feb. 18, 2013 2 pages.

(Continued)

*Primary Examiner* — Harshad R Patel
(74) *Attorney, Agent, or Firm* — St. Onge Steward Johnston and Reens, LLC (57) ABSTRACT

An ultrasonic flow meter including a meter housing, a flow tube with an inner flow channel for a fluid to be measured, and ultrasound reflectors, the meter housing has two transducer recesses, an ultrasound transducer positioned in the first transducer recess, and a second ultrasound transducer positioned in the second transducer recess. The transducer recesses each has slanted bottom walls, with the ultrasound transducers abutted against the slanted bottom walls of the recesses.

19 Claims, 7 Drawing Sheets

(52) U.S. Cl.
CPC .... *Y10T 29/49005* (2015.01); *Y10T 29/49169* (2015.01); *Y10T 29/49217* (2015.01)

(56) References Cited

U.S. PATENT DOCUMENTS

| | | | |
|---|---|---|---|
| 1,473,751 A | 11/1923 | Walker | |
| 3,237,453 A | 3/1966 | Yamamoto et al. | |
| 3,906,791 A * | 9/1975 | Lynnworth | G01F 1/66 73/861.29 |
| 4,195,517 A * | 4/1980 | Kalinoski | G01F 1/66 73/861.27 |
| 4,221,128 A * | 9/1980 | Lawson | G01S 15/582 73/170.13 |
| 4,227,407 A * | 10/1980 | Drost | G01F 1/66 73/861.28 |
| 4,335,617 A * | 6/1982 | Ashmore | G01F 1/663 73/861.25 |
| 4,754,650 A * | 7/1988 | Smalling | G01F 1/662 73/861.28 |
| 4,787,252 A * | 11/1988 | Jacobson | G01F 1/66 73/861.28 |
| 4,930,358 A * | 6/1990 | Motegi | G01F 1/667 73/861.28 |
| 5,090,252 A * | 2/1992 | Tschirner | G01F 1/662 73/861.28 |
| 5,179,862 A * | 1/1993 | Lynnworth | G01F 1/662 73/861.28 |
| 5,351,560 A | 10/1994 | Russwurm | |
| 5,372,047 A | 12/1994 | Russwurm et al. | |
| 5,753,824 A * | 5/1998 | Fletcher-Haynes | G01F 1/667 702/48 |
| 5,831,175 A * | 11/1998 | Fletcher-Haynes | G01F 1/667 702/100 |
| 6,508,134 B1 * | 1/2003 | Feller | G01F 5/00 73/861.22 |
| 6,739,203 B1 | 5/2004 | Feldman et al. | |
| 6,901,812 B2 * | 6/2005 | Moscaritolo | G01F 1/667 73/861.27 |
| 8,893,559 B2 | 11/2014 | Drachmann | |
| 2001/0015107 A1 * | 8/2001 | Feller | G01F 1/662 73/861.27 |
| 2004/0123674 A1 * | 7/2004 | Moscaritolo | G01F 1/667 73/861.27 |
| 2006/0156827 A1 * | 7/2006 | Lang | G01F 5/00 73/861.25 |
| 2007/0186681 A1 * | 8/2007 | Shkarlet | A61B 5/6876 73/861.28 |
| 2008/0271543 A1 * | 11/2008 | Hecht | G01F 1/662 73/861.27 |
| 2009/0178490 A1 * | 7/2009 | Konzelmann | G01F 1/662 73/861.29 |
| 2011/0079090 A1 * | 4/2011 | Kroemer | G01F 1/662 73/861.25 |
| 2011/0271769 A1 * | 11/2011 | Kippersund | G01F 1/42 73/861.28 |
| 2011/0277557 A1 * | 11/2011 | Kroemer | G01F 1/662 73/861.18 |
| 2012/0006127 A1 | 1/2012 | Nielsen | |
| 2012/0272749 A1 * | 11/2012 | Lang | G01F 1/662 73/861.25 |
| 2012/0272750 A1 * | 11/2012 | Fujii | G01F 1/667 73/861.28 |
| 2012/0285260 A1 * | 11/2012 | Mueller | G01F 1/667 73/861.27 |
| 2013/0031988 A1 | 2/2013 | Drachmann | |
| 2013/0047743 A1 * | 2/2013 | Sonnenberg | G01F 1/662 73/861.18 |
| 2013/0312537 A1 * | 11/2013 | Miyata | G01F 1/662 73/861.28 |

FOREIGN PATENT DOCUMENTS

| | | |
|---|---|---|
| DE | 102006023479 A1 | 11/2007 |
| DK | 177040 B1 | 2/2011 |
| EP | 0440867 A1 | 8/1991 |
| EP | 0813041 A1 | 12/1997 |
| EP | 1435511 A2 | 7/2004 |
| EP | 1493998 A2 | 1/2005 |
| EP | 1798528 A1 | 6/2007 |
| EP | 1983311 A2 | 10/2008 |
| EP | 2083250 A1 | 7/2009 |
| EP | 2083251 A1 | 7/2009 |
| EP | 2562517 A1 | 2/2013 |
| JP | H0688738 A | 3/1994 |
| JP | H08178942 A | 7/1996 |
| UA | 69589 A | 9/2004 |
| WO | 2007020375 A1 | 2/2007 |
| WO | 2008053193 A1 | 5/2008 |
| WO | 2010112029 A1 | 10/2010 |
| WO | 2011127934 A1 | 10/2011 |
| WO | 2011141167 A2 | 11/2011 |
| WO | 2012113401 A1 | 8/2012 |

OTHER PUBLICATIONS

International Search Report Application No. PCT/DK2013/050270 Completed: Nov. 21, 2013; Mailing Date: Nov. 28, 2013 3 pages.

* cited by examiner

ULTRASONIC FLOW METER INCLUDING A METER HOUSING INSERT HAVING TRANSDUCER RECESSES WITH SLANTED BOTTOM WALLS

FIELD OF THE INVENTION

The invention relates to an ultrasonic flow meter for measuring the flow of a fluid.

BACKGROUND OF THE INVENTION

Several ultrasonic flow meters exists within the prior art.

An example of such flow meters is found in the European patent application 0 440 867 A1, where the transducers are inserted in bevels.

Another example of an ultrasonic flow meter is found in U.S. Pat. No. 5,351,560, having a W-shaped ultrasonic path and where an inner wall has a stepped elevation/depression at the reflection site of the V-shaped parasitic ultrasonic path.

Yet another example of an ultrasonic flow meter is found in U.S. Pat. No. 5,372,047, having reflection points, which have a focusing effect on an ultrasonic beam.

A problem related to the above mentioned prior art is how to provide an efficient and cost-effective ultrasonic flow meter and the assembly of such flow meters.

SUMMARY OF THE INVENTION

It is an object of the invention to provide a compact ultrasonic flow meter.

It is a further object of the invention to provide an efficient and cost-effective ultrasonic flow meter and a method for assembling such an ultrasonic flow meter.

The invention relates to an ultrasonic flow meter comprising
  a meter housing,
  a flow tube defining an inner flow channel for a fluid to be measured, and
  one or more ultrasound reflectors,
said meter housing comprising
  a first transducer recess,
  a second transducer recess,
  a first ultrasound transducer positioned in said first transducer recess,
  a second ultrasound transducer positioned in said second transducer recess, and
  an electronic circuit for operating said ultrasonic flow meter,
wherein said transducer recesses each has slanted bottom walls, and
wherein said first and second ultrasound transducers are in abutment with said slanted bottom walls of said first and second transducer recess, respectively.

In the present context it is to be understood that said first ultrasound transducer is in abutment with said slanted bottom wall of said first transducer recess and that said second ultrasound transducer is in abutment with said slanted bottom wall of said second transducer recess.

The ultrasonic flow meter is adapted to measure the average flow velocity of the fluid. This may preferably be done by said first ultrasound transducer emitting a first ultrasound pulse. The first transducer is positioned such that the first ultrasound pulse is incident on the first ultrasound reflector, which reflects the first ultrasound pulse towards the second ultrasound transducer, which then receives or detects the first ultrasound pulse. Thereby, a first path from the first ultrasound transducer, via the first ultrasound reflector, and onto the second ultrasound transducer is defined. Similarly, the second ultrasound pulse is sent from the second ultrasound transducer, via the first ultrasound reflector and onto the first ultrasound transducer, thereby defining a second path. By measuring a first transit time as the time between emitting and detecting the first ultrasound pulse, and a second transit time as the time between emitting and detecting the second ultrasound pulse, the mean velocity of the fluid can be calculated from the two transit times and the geometry of the transducers and reflectors.

Said first ultrasound reflector is adapted to reflect the ultrasound, thereby redirecting the path of the ultrasound beam from one ultrasound transducer to the other ultrasound transducer.

When said transducer recesses extend into the flow tube, a particular advantage of the invention is achieved. This is that due the ultrasound transducers being slanted relative to the transducer recesses, these ultrasound recesses can be constructed with a smaller diameter or cross-sectional area, whereby the tube openings can be made with a smaller diameter or area. Since these areas are reduced, the pressure exerted by the fluid in the flow channel upon the transducer recesses extending into the flow channel can be reduced. This results in reduced the minimum limits on material strength and on the construction design, which are a result of this fluid pressure. A result from these reduces limitations is that a more compact flow meter may be constructed, due to e.g. reduced need for connection strength between the meter housing and the flow tube.

Another advantage of the invention may be that the meter housing including its components may be assembled as a single mechanical unit. Thereby, the ultrasonic flow meter may be produced and assembled in a simple and cost-effective way.

Yet another advantage of the invention may be that since the ultrasound transducers have a slanted orientation, flow tubes of different diameters may be fitted to the same meter housing. Only the position and/or the orientation of the one or more ultrasound reflectors have to be changed. Preferably, the ultrasound reflectors may be fixated by a flow channel insert. Thereby, for each flow tube with different diameters, a flow channel insert may be constructed that fits the particular tube, and which furthermore includes ultrasound reflectors in the adjusted positions and orientations so that an ultrasound signal reflected by the first ultrasound transducer propagates via the ultrasound reflectors to the second ultrasound transducer. Since the meter housing may typically represent the main expenses of the tools for production of the ultrasonic flow meter it may be expensive to produce different meter housings for each flow tube diameter. However, since a meter housing can be fitted to flow tubes of different diameters, this extra cost may be avoided or reduced.

One particular advantage of the invention may be that the housing and the first and second meters are all in physical connection with each other thereby forming a single unit. Thereby it may be substantially easier to comply with various tolerances that such meters typically must comply with. In more detail, by putting said first and second transducers in abutment with said slanted bottom walls of said transducer recesses, preferably by making physical contact between each of the transducers and the corresponding bottom wall of the corresponding transducer recess by means of e.g. conductive adhesive, electrical connectivity between the transducer and the contact positioned on the bottom wall is obtained and, furthermore, a relatively rigid fixation of the transducer relative to the housing, and, thereby, relative to the other transducer is obtained.

One further advantage of the invention is that by using slanted transducer recesses an ultrasound path between said first to said second transducer, or vice versa, can be constructed such that the ultrasound path at all points have a component in a longitudinal direction of the flow tube, i.e. the path is non-orthogonal to the longitudinal direction of the flow tube at all points. Thereby, the whole of the ultrasound path are affected by the flow of the fluid to be measured, and, therefore, contributes to a more precise and accurate measurement. In other words, a flow meter of the present invention may achieve a relatively high signal-to-noise rate compared to other solutions, without said meter of the invention employing power-depleting measures, such as transmitting a stronger signal and/or repeating the measurement several extra times and performing an average. This may be a particular advantage for battery-powered meters, and may even be for externally powered meters, should such meters loose the external powering and have to rely on a backup battery power source.

One particularly advantageous aspect of the invention may be that the first and second transducers are both placed inside and as a part of the meter housing. Thereby, it is to be understood that an ultrasound signal emitted by the first ultrasound transducer, and reflected by the one or more ultrasound reflectors, before being detected by the second transducer, will propagate from the emitting surface of the first transducer through the slanted bottom wall of the e first transducer recess, through the fluid in the flow channel, reflected by the one or more ultrasound reflectors while still propagating through the fluid, and through the slanted bottom wall of the second transducer recess, before finally reaching the transmitting surface of the second ultrasound transducer where the ultrasound signal is detected and transformed into an electrical signal by the second transducer.

One further advantage of the invention may be that aggregation of gas bubbles on the transducer-fluid interface may be avoided even if the flow tube is orientated with the meter display upwards, which may often be preferred by consumers, since this orientation permits easy readout of the display. However, when the display is faced upwards, the transducers in typical compact meter setups will be located in the upper part of the flow tube. Since gas bubbles, such as air bubbles, may often be released by the fluid, e.g. air bubbles from water, these gas bubbles may often aggregate near the highest point in the flow tube due to gravity. Such aggregation of gas bubbles near on the meter-fluid interface is highly disadvantageous, since the efficiency of the coupling of ultrasound between the transducers and the fluid becomes relatively low. However, since the transducer recesses are slanted, such gas bubbles may not aggregate on meter-fluid interface, but rather move upwards along the slanted bottom walls of transducer recesses and away from at least position on the meter-fluid interface corresponding to the center of the transducer.

According to an embodiment of the invention, it is to be understood that a transducer recess is a local extension of the inner space of the meter housing, in which an ultrasound transducer may be positioned. Thereby, the ultrasound transducer can emit an ultrasound signal through the slanted bottom wall of the transducer recess and into the flow channel of the ultrasonic flow meter, and vice versa receive an ultrasound signal through propagating through said slanted bottom wall of said transducer recess.

According to an embodiment of the invention, the ultrasonic flow meter is adapted for measuring a flow velocity of a fluid flowing through the flow channel. This fluid may be liquids as well as gasses, particularly liquids such as water.

According to an embodiment of the invention, said first and a second transducer recess extends through a first and a second tube opening in said flow tube and into said flow channel.

Thereby, in the context of the above embodiment it is particularly advantageous that the size of the transducer recesses is reduced, thereby reducing the pressure from the fluid on the meter housing.

According to an embodiment of the invention, said ultrasound transducers are positioned inside said meter housing, and wherein at least one of said ultrasound transducers is configured for, during operation of said ultrasonic flow meter, to emit an ultrasound signal, said ultrasound signal propagating through said slanted bottom wall abutting said at least one ultrasound transducer, through said fluid in said flow channel, and said ultrasound signal being reflected by said one or more ultrasound reflectors, then propagating through said slanted bottom wall abutting the other ultrasound transducer receiving said ultrasound signal.

According to an embodiment of the invention, said first ultrasound transducer and said one or more ultrasound reflectors are positioned and orientated so that if, during operation of said ultrasound flow meter, a first ultrasound signal is emitted from said first transducer, said first ultrasound signal is reflected by said one or more ultrasound reflectors and detected by said second ultrasound transducer, and vice versa if said second ultrasound transducer emits a second ultrasound signal it is detected by said first ultrasound transducer.

According to an embodiment of the invention, said first and second ultrasound transducers are positioned and orientated so that when, during operation of said ultrasonic flow meter, a first ultrasound signal is transmitted from said first ultrasound transducer, said first ultrasound signal will propagate through said slanted bottom wall of said first transducer recess, through the fluid in the flow channel, reflected by said one or more reflectors, and through said slanted bottom wall of said second transducer recess, before being detected by said second ultrasound transducer, and vice versa a second ultrasound signal may be transmitted from said second ultrasound transducer to said first ultrasound transducer through said slanted bottom walls of said transducer recesses.

By a slanted bottom wall may in one embodiment be meant a bottom wall, where the surface this bottom wall is non-orthogonal to the direction the side walls of the transducer recess, i.e. an inclined bottom wall. Here it should be noted that the longitudinal axis of the recess is defined by the sides of the recess. Thereby, the longitudinal axes of the transducer recesses are preferably orientated orthogonal with a longitudinal axis of the flow tube. A particular aspect of the invention is that the first and second transducers are both placed in the meter housing. Thereby, it is to be understood that an ultrasound signal emitted by the first ultrasound transducer, and reflected by the one or more ultrasound reflectors, before being detected by the second transducer, will propagate from the emitting surface of the first transducer through the slanted bottom wall of the e first transducer recess, through the fluid in the flow channel, reflected by the one or more ultrasound reflectors while still propagating through the fluid, and through the slanted bottom wall of the second transducer recess, before finally reaching the transmitting surface of the second ultrasound transducer where the ultrasound single is detected and transformed into an electrical signal by the second transducer. An example of such a transducer recess with a slanted bottom wall is a tube extending from the meter housing, and having a bottom wall the surface of which is being non-orthogonal to a longitudinal axis of the tube.

I.e. said housing comprises a first transducer recess, in which the first ultrasound transducer is positioned, and a second transducer recess, in which the second ultrasound transducer is positioned.

It is to be noted that since the transducer recesses each have a slanted bottom wall on which the ultrasound transducer is positioned, said first transducer has a first ultrasound transmitting surface and said second transducer has a second ultrasound transmitting surface, wherein said first and second transmitting surfaces have a non-orthogonal orientation with respect to a longitudinal axis of said first and second transducer recess, respectively. Also, one can equivalently define the orientation of the ultrasound transducers by said first and second ultrasound transmitting surfaces being non-parallel to a longitudinal axis of the flow channel. Yet another way of defining the orientation of the first and second ultrasound transducers is that the path of an ultrasound signal emitted by the first or second ultrasound transducer will be non-parallel to the longitudinal axes of the first and second transducer recesses, and also non-orthogonal to the longitudinal axis of the flow tube.

According to an embodiment of the invention, said longitudinal axis of each elongated transducer recesses is orthogonal with respect to a longitudinal axis of the flow channel.

Thereby, the assembly of the ultrasonic flow meter is made easy, since a single-piece meter housing can be inserted through tube openings in the flow tube and into the flow channel. Since this insertion is done by moving the meter housing in a direction orthogonal to longitudinal axis of the flow channel, this insertion is simple, and furthermore, the tube openings can be constructed with a size and form fitting the cross-sectional size and form of the transducer recesses, e.g. by fitting the diameter of the tube openings to the diameter of transducer recess for cylindrical transducer recesses.

According to an embodiment of the invention, the ultrasonic flow meter comprises a first, a second, and a third ultrasound reflector).

It is preferred that the ultrasonic flow meter comprises three ultrasound reflectors, preferably positioned in a so-called W-geometry. By a W-geometry is meant a position and orientation of the ultrasound transducers and the ultrasound reflectors such that the path of the ultrasound signal takes the form of a W when viewed from the side. Thereby, the path length of the ultrasound may be maximized to give a longer transit times. By increasing the transit times, it may be secured that the signal-to-noise ratio may be decreased, even for a compact flow meter. This is especially true for ultrasonic flow meters that in addition to a transit time differences includes an absolute transit time for flow measurements.

However, in alternative embodiments, only a single or two ultrasound reflectors are used. In some embodiments, where flow tubes of larger diameter are used it may be particularly advantageous to use only a single ultrasound reflector.

According to an embodiment of the invention, said housing comprises a battery.

Thereby, the ultrasonic flow meter may be independent of an external power supply. One particular advantage of the above embodiment may be that a meter may be more energy efficient, while retaining the same signal-to-noise ratio.

When each of said transducer recesses has a slanted bottom wall, and when said first and second ultrasound transducers each are in abutment with the corresponding slanted bottom wall of the corresponding transducer recess, the path of the ultrasound from said first to said second transducer, or vice versa, may be constructed such that the path have at least a non-zero component parallel with the longitudinal axis of the flow channel, i.e. the overall flow direction. As only the components of an ultrasonic path, which are parallel to the flow direction, contributes to a time delay, and therefore to the measurement of the flow, the meter according to the above embodiment may be constructed to give a higher signal without the use of additional reflectors. As many ultrasound meters may use transducers emitting a signal travelling substantially orthogonal to the flow direction, the path of the ultrasound in such meters between the emitting transducers and the first reflecting ultrasound reflector along the ultrasound path does not contribute to the measurement of the flow, but only contribute noise and/or attenuation of the signal, therefore lowering the signal-to-noise ratio. Typically, this may be compensated by transmitting a stronger signal or taking an average over several measurements. The inventor of the present invention, however, has realized that such power-depleting measures may be avoided, or at least minimized, by using transducers emitting ultrasound in a non-orthogonal direction relative to the flow direction.

According to an embodiment of the invention, said one or more ultrasound reflectors consists of three ultrasound reflectors.

Thereby, an ultrasonic signal emitted by said first ultrasound transducer and detected by said second ultrasound transducer, or vice versa, is reflected exactly three times by three different ultrasound reflectors.

In the present context of the above embodiment it should be understood that the ultrasonic flow meter comprises exactly three ultrasound reflectors used to reflect ultrasound between said first and second transducer. Thereby, a relatively high signal-to-noise ratio may be achieved and a rather precise measurement may be performed without employing alternative power-depleting measures, such as e.g. increasing the strength of the emitted signal or repeating the measurement several times.

According to an embodiment of the invention, said housing comprises a display.

By said meter housing including a battery and a display, a simplistic design may be achieved where no need for external wiring is needed for power supply or communication. This may be a great advantage in the production of the meter, for the user who does not have to connect power supply or read-out equipment, and furthermore since the housing may be sealed to as to extend the life-time of the meter.

Furthermore, by incorporating all electronic equipment in the meter housing, the need for any external wiring to the meter is eliminated.

According to an embodiment, the paths of the ultrasound will lie within a longitudinal symmetry plane of the flow chamber, i.e. the parts of the path will span only a single plane parting the flow chamber in two equal-sized parts along the longitudinal direction. Alternatively, however, the ultrasound reflectors and possibly the transducers may be orientated such that the parts of the ultrasound paths do not fall within a single plane.

According to an embodiment of the invention, said ultrasound transducers have a bottom side facing the bottom walls of the first and second transducer recesses, and wherein the meter housing comprise a metal layer contact being in electrical contact with the bottom sides of the ultrasound transducers and in electrical contact with the electronic circuit.

By means of the metal layer, electronic contact is facilitated between the bottom sides of the ultrasound transducers and the electronic circuit. Such contact may otherwise be difficult to establish and may require a tedious assembly process. Furthermore, the metal layer provides compact electrical connections and thereby allows the assembly of a compact ultrasonic flow meter.

One particular advantage of the above embodiment may be that substantially the whole of the surface of the transducer may be effective as an ultrasound emitting surface. Otherwise, e.g. if the transducer has a wrap-around contact, i.e. where the contact facing the flow tube extends onto the opposite side of the transducer for easier access for electrical connections, the effective area of the transducer, which emits ultrasound, may be substantially diminished. Therefore, when using such a metal layer contact, the overall area of the transducer can be lowered, and therefore the area of the transducer recesses may be lowered. This, furthermore, may be a substantial advantage, as the structural strength of the meter housing, the locking pins, etc. may be determined by such parameters as the pressure of the fluid in the flow channel and the area of the holes in the flow tube through which the transducer recesses extends, or extends at least partly. Thereby, dimensioning of the meter housing, pins, etc. may not be as critical, which may lower the material costs, assembly costs etc.

It is to be understood that this bottom side is the transmitting side of the ultrasound transducers, which during operation of the ultrasonic flow meter can emit or detect an ultrasound signal.

Another advantage of the above embodiment is that it is possible to use smaller transducers, such as smaller piezoelectric elements of the transducers. By using smaller transducers, the protrusions of the meter housing, which extends into the flow channel, may be decreased, resulting in a decreased pressure on the meter housing from the fluid in the flow channel. Such as pressure may indeed be very high, and may call for a forceful connection between the meter housing and the flow channel tube. However, by decreasing this pressure, such measures may not need to be taken into account, at least to a lesser degree.

According to an embodiment of the invention, each of the ultrasound transducers have an upper side connected to a first and a second elastic contact, respectively.

By an elastic contact is meant a flexible or spring-like contact. However, a coil spring may be unsuitable for contacting with the transducers, since these are orientated with an angle relative to the longitudinal axis of the flow chamber and therefore also relative to the meter housing. It may therefore be preferred to use a metal strip, which may be curved, to provide a flexible contact suitable for connecting said transducers to the electronic circuit.

Furthermore, since such elastic contacts may provide a force towards the flow chamber, or at least a force with a substantial component in a direction towards the flow chamber, the transducer may be fixated by this force. This may provide with improved electrical contact not only between the elastic contact and the transducer, but also between the transducer and the metal layer, or at least an ensured contact, i.e. less probability of loss of electrical connection.

In connection with the above embodiment, it should be understood that said upper and lower sides are to be understood as two opposing sides of the transducer. Since the transducers have an emitting surface, which is orientated with an angle relative to the longitudinal axis of the flow chamber, the lower side is to be understood as the emitting surface of the transducer, which faces the flow chamber, while the upper side should be understood as the opposite side or surface relative to the lower side.

Another advantage of the above embodiment is that it is possible to use smaller transducers, such as smaller piezoelectric elements of the transducers. By using smaller transducers, the protrusions of the meter housing, which extends into the flow channel, may be decreased, resulting in a decreased pressure on the meter housing from the fluid in the flow channel. Such as pressure may indeed be very high, and may call for a forceful connection between the meter housing and the flow channel tube. However, by decreasing this pressure, such measures may not need to be taken into account, at least to a lesser degree.

Furthermore, since metal spring contacts may traditionally be used to provide electrical connection between the electronic circuit and the transducers, and since such metal springs are unsuitable for use with slanted transducers due to a geometric misfit, such slanted transducers may traditionally be considered disadvantageous. However, the elastic contacts provide a simple solution for using the slanted transducers.

According to an embodiment of the invention, the elastic contacts comprise curved metal strips.

According to an example embodiment the transducers are piezoelectric elements. By contacting two opposing sides of such a piezoelectric element to an electrical power source, and by means of the electrical power source putting an alternating voltage across the piezoelectric element, the piezoelectric element vibrates according to the alternating voltages thereby generating an acoustic signal, such as an ultrasound signal.

According to an embodiment of the invention, the ultrasound transducers are focused.

By focusing the ultrasound signal by using focused transducers, several advantages are obtained. One of these advantages is that the intended signal, i.e. the signal following the first or second ultrasound path, may be transmitted more efficiently from the first transducer to the second transducer and vice versa. Another advantage is that unintended ultrasound paths, such as the V-path, will be transmitted less efficiently between the two ultrasound transducers.

According to an embodiment of the invention, the ultrasonic flow meter furthermore comprises a flow channel insert.

Such a flow channel insert may provide a single and therefore cost-effective assembly of the compact flow meter. Furthermore, such a flow channel insert may provide fixation of ultrasonic reflectors, narrowing of the room in which the fluid may flow resulting in a higher flow velocity, guiding of the fluid to increase the overlap with the ultrasound path, blocking or otherwise discrimination of un-wanted or parasitic ultrasound paths.

Preferably, such a flow channel insert may be assembled from two half-parts, preferably mirror-symmetrical.

According to an embodiment of the invention, said one or more ultrasound reflectors are fixated in said flow channel insert.

For example, the ultrasound reflectors may be fixated in the flow channel insert in the assembly of the flow channel insert, preferably by assembling the flow channel insert from two half-parts and fitting the ultrasound reflectors in between the half-parts. By said ultrasound reflectors being fixated to said flow channel insert, it is to be understood that the ultrasound reflectors may form a part of the flow channel insert.

According to an embodiment of the invention, said flow channel insert is assembled from two mirror-symmetrical half-parts, the assembled flow channel insert having a partition surface between the half-parts, said partition surface extending from the side of said flow tube facing the meter housing to the opposite side of said flow tube.

According to an alternative embodiment, the partition surface extends across the flow tube in substantially the same distance from said meter housing. I.e. one side of the partition surface faces the meter housing, while the opposite side faces away from said meter housing.

However, the above embodiment where the partition surface extends from the side of said flow tube facing the meter housing to the opposite side of said flow tube may be preferred, since all ultrasound reflectors may be positioned in the partition surface in that embodiment. This may be a particular advantage during assembly of the ultrasonic flow meter, since none of the ultrasound reflectors need to be embedded into any of the half-parts. Rather each ultrasound reflector may simply be fixated by symmetrical recesses in each of the two half-parts.

According to an embodiment of the invention, the flow channel insert comprises guide elements for guiding the flow of the fluid.

By said guide elements the flow of the fluid through the flow channel insert is modified to provide a greater spatial overlap between the flow path and the ultrasound signal path. This effect is especially pronounced for smaller meters. By increasing the overlap, the interaction may also be increased, which leads to a greater difference in upwards and downwards travel times, which in turn may result in a lesser uncertainty in the measurement of the velocity of the fluid flow by decreasing the signal-to-noise ratio.

Furthermore, since the guide elements may protrude into the inner space of the flow chamber, they may along with the rest of the flow channel insert contribute to an increased local pressure of the fluid in the flow channel insert, which leads to a greater difference between the upwards and the downwards transit times of the ultrasound signal, thereby decreasing the relative uncertainty of the measured fluid flow velocity.

According to an embodiment of the invention, the guiding elements of the flow channel insert are adapted for extinguish ultrasound.

By extinguish is meant that the guiding element discriminates against any ultrasound signal which is incident in the surface of the guiding element. The physical mechanisms of this extinguishing may be different, such as e.g. blocking or absorbing the ultrasound signal, by scattering the ultrasound signal, or by redirecting ultrasound signal such that it to a lesser degree reaches the which should detect the ultrasound signal with the correct travel path. Such redirection may e.g. be by defocusing or reflection in a certain direction etc. Defocussing may e.g. be done by a convex surface. This effect gives the advantage of interfering and possibly blocking alternative paths of the ultrasound pulses from the first transducer to the second transducer and vice versa, such as e.g. the so-called V-path.

According to an embodiment of the invention, one or more of the ultrasound reflectors are focusing.

This may preferably be done by using concave reflectors. Alternatively, it may be done by means of lens-like objects in front of the reflectors, or a combination thereof concave mirror and lens-like objects. This discriminates between the W-path and other paths, which are un-wanted or parasitic, such as the V-path, by increasing the signal from the W-path.

According to an embodiment of the invention, reflective surfaces of the first and third ultrasound reflectors are orientated such that these reflective surfaces have angle with respect to the longitudinal axis of the flow channel.

In the present context having an angle with respect to the longitudinal axis of the flow channel is to be understood as the reflecting surface of the ultrasound reflector being non-parallel to the longitudinal axis. In cases where the ultrasound reflectors are non-plane, it is to be understood that the ultrasound reflector according to the present embodiment is orientated such that the plane surface, which makes the best approximation for the reflective non-plane surface, is non-parallel with the longitudinal axis. Such a best approximation could e.g. be the plane, which gives the same direction of propagation of the reflected ultrasound signal as the actual reflector does.

An advantage of the above embodiment is that the same meter housing may be fitted to different flow channel tubes of different diameters without changing the orientation of the ultrasound transducers. Instead, the non-parallel ultrasound reflectors may be positioned and orientated according to the geometry of the flow channel tube, e.g. by fixation of the ultrasound reflectors in different flow channel inserts adapted to fit the respective flow channel tubes. Thereby, only a single type of meter housings has to be produced, and since tools to produce this part may constitute a dominant part of the manufacturing expenses, this is a great advantage. Also, existing meter housings may be adapted to other flow channel tubes without adjustment of the ultrasound transducers.

A further advantage of using slanted reflectors is that this may prevent the collection of debris from the fluid in the reflectors, or at least decrease the effect of such debris collection. Though some debris may collect on the reflector, due to the asymmetry orientation of the reflector, the debris collection may be largely confined to areas near the edge of the reflector, which thereby maintains a high reflectively of the ultrasound signal.

According to an embodiment, the one or more ultrasound reflectors are fixated to the flow channel insert. This may e.g. be done by assembling the flow channel insert from two symmetrical elements, which when assembled lock together about the one or more ultrasound reflectors.

According to an embodiment of the invention, the flow channel insert is fixated relative to the flow tube by the meter housing.

This fixation may e.g. be provided by letting the meter housing have two protrusions containing the two ultrasound transducers. These two protrusions may then extend into the flow channel According to an embodiment of the invention, the meter housing is fixated relative to the flow tube by one or more locking pins.

By means of one or more of the above embodiments, the flow meter may be assembled by said flow channel insert fixating said ultrasound reflectors, furthermore by said meter housing fixating said flow channel insert, and finally by said meter housing being fixated to said flow channel by means of a split insert. Thereby, an advantageous assembly method for assembling said flow meter is provided. One advantage of this assembly method is that it may be done without adjusting the orientation of transducers and/or ultrasound reflectors, as these are determined from their respective holding means, i.e. the meter housing for the transducers and the flow channel insert for the ultrasound reflectors.

The invention furthermore relates to a method of assembling an ultrasonic flow meter, said ultrasonic flow meter comprising
- a meter housing,
- a flow tube defining an inner flow channel for a fluid to be measured, and
- a flow channel insert, said flow channel insert comprising
- one or more ultrasound reflectors and
- a first and a second insert opening, said meter housing comprising
- a first transducer recess,
- a second transducer recess,
- a first ultrasound transducer positioned in said first transducer recess,
- a second ultrasound transducer positioned in said second transducer recess, and
- an electronic circuit for operating said ultrasonic flow meter, wherein said transducer recesses each has slanted bottom walls, and
wherein said first and second ultrasound transducers are in abutment with said slanted bottom walls of said first and second transducer recess, respectively, said method comprising the steps of
- inserting said flow channel insert into said flow channel,
- inserting said first and second transducer recesses through said first and second tube openings and into said first and second insert openings, and
- fixating said meter housing to said flow tube.

Thereby, a simple method of assembling an ultrasonic flow meter is provided, which is efficient and cost-effective. This is an advantage of the invention.

According to an embodiment of the invention, the method according to the above embodiment is provided for of assembling an ultrasonic flow meter according to any embodiment of the invention.

FIGURES

The invention will be described in the following with reference to the figures in which.

DETAILED DESCRIPTION OF THE INVENTION

Figure 1:
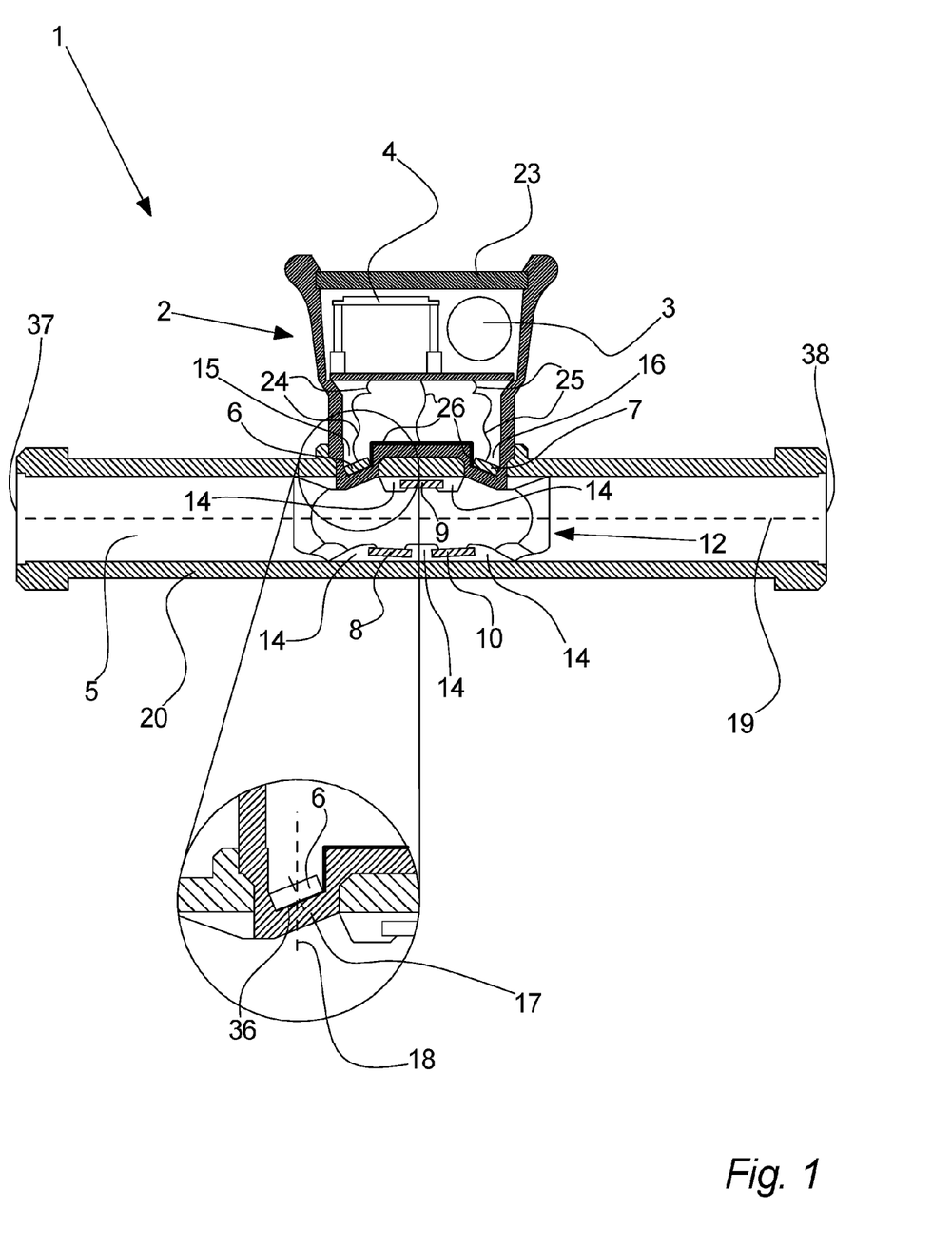
FIG. 1 illustrates a cross-sectional view of an ultrasonic flow meter according to an embodiment of the invention.

Referring to FIG. 1, an embodiment of the invention is illustrated. An ultrasound flow meter 1 is shown; the ultrasound flow meter 1 comprising a meter housing 2, a flow tube 20, and a flow channel insert 12. The meter housing 2 comprises an electronic circuit 4, a battery, a first and a second transducer recess 15, 16, a first and a second transducer 6, 7, a first and a second elastic contacts 24, 25, a metal layer contact 26, and a display 23. The electronic circuit 4, which is powered by the battery 3, and which is in contact with the first and a second transducer 6, 7 via the first and the second elastic contact 24, 25 and the metal layer contact 26, which comprises a metal layer and an elastic part. The first and second ultrasound transducers 6, 7 are positioned in the first and second transducer recesses 15, 16, respectively. As can be seen on FIG. 1, these transducer recesses 15, 16 each have slanted bottom walls 17. Since the first and second transducers 6, 7 are positioned in the bottom of the transducer recesses 15, 16, ultrasound emitting surfaces 36 of the ultrasound transducers 6, 7 are for each transducer 6, 7 orientated non-orthogonal with respect to a longitudinal axes 18 of the transducer recesses 15, 16. This longitudinal axis 18 may be defined e.g. to be parallel to the side walls of the respective transducer recess 6, 7. The flow channel insert 12 comprises a first, a second, and a third ultrasound reflector 8, 9, 10, which are positioned and oriented to reflect and guide and ultrasound signal emitted by the first ultrasound transducer 6, onto the second ultrasound transducer 7, which then can detect the ultrasound signal, and vice versa reflect or guide an ultrasound signal from the second ultrasound transducer to the first ultrasound transducer. The flow tube 20 has a first and a second tube end opening 37, 38 and defines a flow channel 5 as an inner space between the tube end openings 37, 38. During operation of the ultrasonic flow meter 1, the first and second tube end openings are connected to a piping system for moving said fluid. The fluid flows through the first tube end opening, through the flow channel 5, and out through the second tube end opening 37, 38, or the opposite direction. During the following description, the fluid is described as flowing from the first to the second tube end opening 37, 38, but of course the fluid may flow in the opposite direction. An ultrasound signal is emitted from the first ultrasound transducer 6. The ultrasound signal moves through the slanted bottom wall 17 of the first transducer recess 15, through the fluid onto the first ultrasound reflector 8, which reflects the ultrasound in a direction towards the second ultrasound reflector 9, which in turn reflects the ultrasound signal in a direction towards the third ultrasound reflector 10. The third ultrasound reflector 10 reflects the ultrasound signal towards to second ultrasound transducer 7. The ultrasound signal moved through the slanted bottom wall 17 of the second transducer recess 16 and onto the second ultrasound transducer 7, where the ultrasound signal is detected and converted into an electronic signal, which is sent to the electronic circuit 4. Then, an ultrasound signal may be sent in the opposite direction, i.e. from the second ultrasound transducer 7 to the first ultrasound transducer 6, where the signal is also converted into an electrical signal, which is sent to the electronic circuit 4. By comparing the travel time of the two ultrasound signals, i.e. the temporal duration between the moment where the ultrasound signal is emitted by the one transducer and until the moment it is detected by the other transducer, the velocity of the fluid may be calculated. Then by knowing the flow profile of the flow tube 20, the flow velocity is converted into a volume per time. Finally, by summing this volume per time over time, the consumed volume is measured. These calculations in some embodiments be performed by the electronic circuit 4, but may also be performed at a central facility of the utility company, i.e. the meter data such as travel times or other data representative of travel times may be extracted from the meter by e.g. manual read-outs or using wireless technology, such as e.g. radio communication.

According to an embodiment of the invention, the velocity of the fluid flowing through the measurement chamber can be calculated on the basis of a measurement of the transit time (time-of-flight) from the first transducer to the second transducer and vice versa, preferably by measuring the difference in the two transit times. The relationship between the transit times ($t_{up}$=transit time when the ultrasound signal propagates against the fluid flow, $t_{down}$=transit time when the ultrasound signal propagates in the same direction as the fluid flow) and the flow velocity of the fluid may vary according to different geometries, i.e. with different flow paths ultrasound signal. However, it may typically apply that $$v_{fluid} \propto \frac{\Delta t}{t^2}$$

where $v_{fluid}$ is the flow velocity of the fluid flowing through the measurement chamber, $\Delta t$ is the difference between the transit time against the flow $t_{up}$ and the transit time with the flow $t_{down}$, and t is the transit time of the ultrasound signal. By increasing $\Delta t$ the relative uncertainty of the measurement is decreased, however, by increasing t the uncertainty is drastically reduced, as t participates as squared. Therefore, the flow meter according to various embodiments has reduced uncertainty in the measurement of $v_{fluid}$, since both $\Delta t$ and t are increased.

Here, it should be noted that this invention is not bound by the above presented theoretical presentation, which is merely presented to illustrate the advantages of the invention.

Figure 2:
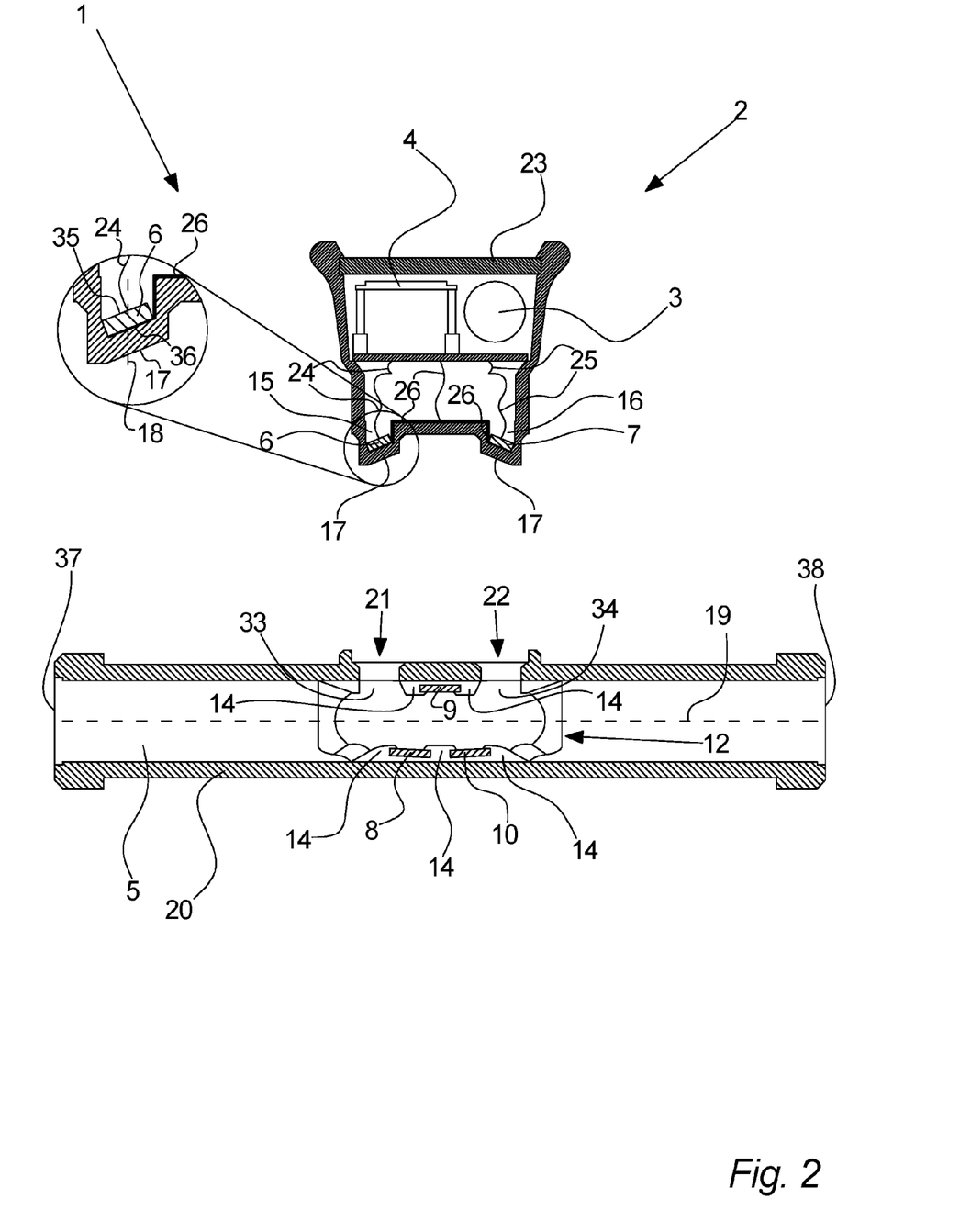
FIG. 2 illustrates a cross-sectional view of an ultrasonic flow meter prior to assembly of the meter housing with the flow tube according to an embodiment of the invention.

Referring to FIG. 2, an embodiment of the invention is illustrated. Further to the above described embodiment, the present embodiment illustrates an ultrasonic flow meter 1 prior to assembly of said meter housing 2 with said flow tube 20. Here, it is can be seen that the first and second transducer recesses 15, 16, in which the first and second ultrasound transducers 6, 7 are positioned, can be inserted into a first and a second tube opening 21, 22 in the flow tube 20. In relation to the assembly of the ultrasonic flow meter 1, it can be seen on FIG. 2 that the flow channel insert 12 is positioned in a position such that the first and second tube opening 21, 22 in the flow tube 20 are positioned next to a first and a second insert opening 33, 34 in the flow channel insert 12. Thereby, the first and second transducer recess 6, 7 is, during assembly of the ultrasonic flow meter 1, inserted into the first and second tube openings 21, 22 in the flow tube 20 and into the first and second insert openings 33, 34. Thereby, the positions of the flow tube 20 and the flow channel insert 12 are fixated with respect to each other due to the engagement of the first and second transducer recesses 6, 7 into the first and second tube openings 21, 22 and the first and second insert openings 33, 34. This fixation is, however, dependent on the fixation of the meter housing 2 to the flow tube 20. This fixation may be facilitated e.g. by insertion of one or more locking pins 11 through engagement openings of the flow tube 20 and the meter housing 2. The setup of the present embodiment may advantageously reduce the pressure on the meter housing 2 from a fluid in the flow channel 5 since the size of the transducer recesses 15, 16 may be reduced due to the slanted positioning of the ultrasound transducers 6, 7, but this setup may also induce a problem of how to electrically connect the electrical circuit 4 with the transducers 6, 7. However, as is shown partly by the magnification, by means of a first elastic contacts 24, which are in contact with the upper surface 35 of the first transducer 6, and a metal layer contact 26, which are in contact with the emitting surface 36 of the first transducer 6, the first transducer 6 is put into electrical contact with the electrical circuit 4. Similarly, the second transducer 7 is put into contact with the electrical circuit 4 by means of the second elastic contact 25 and the metal layer contact 26. In the present embodiment, a common metal layer contact 26 is used. However, in alternative embodiments two separate contacts may be used.

Figure 3:
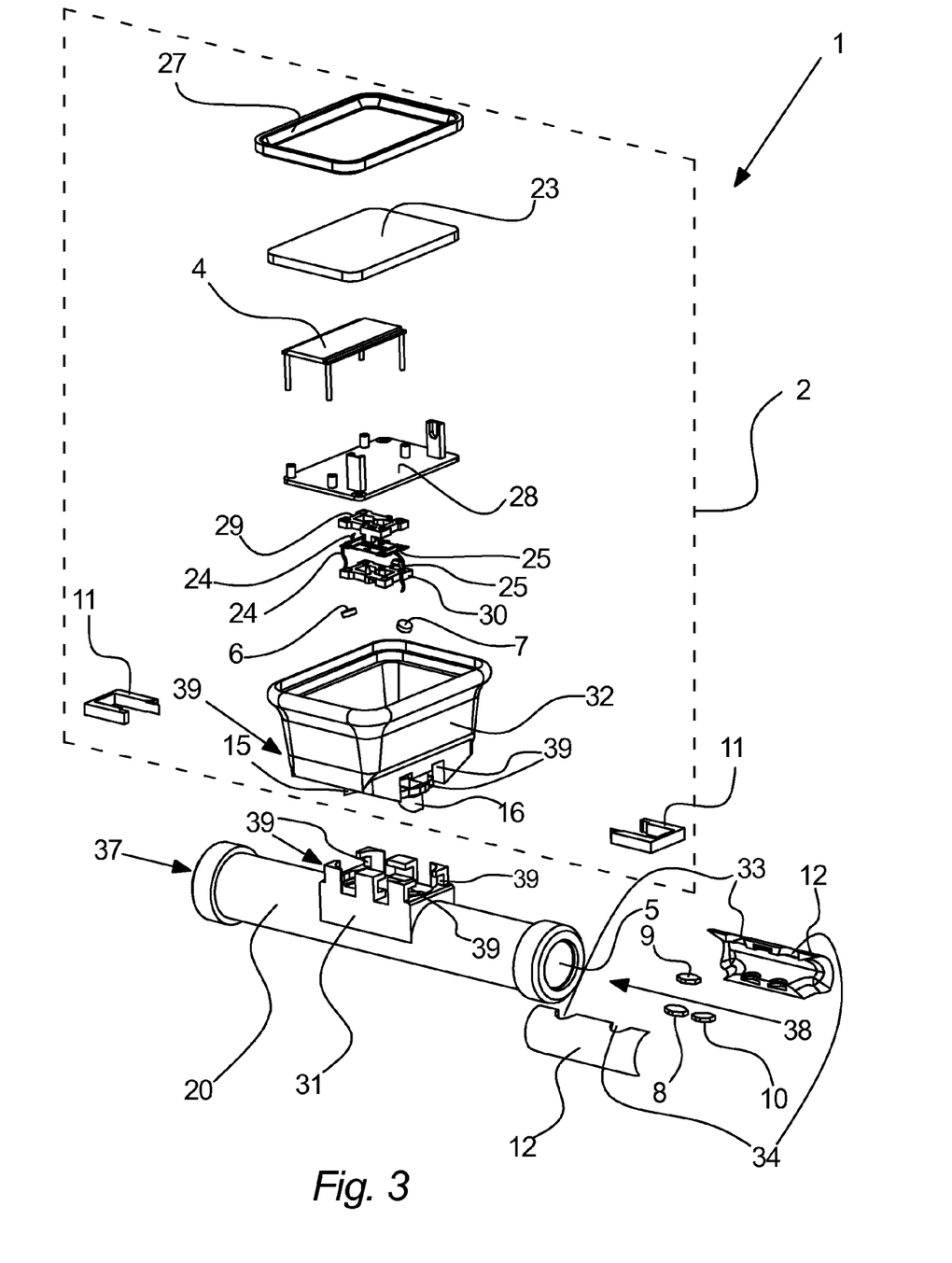
FIG. 3 illustrates the parts of a cross-sectional view of an ultrasonic flow meter according to an embodiment of the invention.

Now, referring to FIG. 3, an embodiment of the invention is illustrated. In FIG. 3, the ultrasonic flow meter 1 is shown before assembly, i.e. the individual parts can be seen. The meter housing 2 of the ultrasonic flow meter 1 is assembled from a number of different parts. A meter housing body 32 has in the bottom a first and second transducer recess 15, 16. The first and second transducer recesses 15, 16 are each adapted to receive one of a first and second ultrasound transducer 6, 7. The first and second transducer recesses 15, 16 have slanted bottom walls 17, which results in the first and second ultrasound transducers 6, 7 to be orientated such that their respective ultrasound emitting or receiving surfaces are non-parallel to a longitudinal axis 19 of the flow channel 5 and non-orthogonal to longitudinal axes 18 of the transducer recesses 15, 16. The meter housing 2 also comprises an electronic circuit 4, which is in electrical contact with said first and second ultrasound transducers 6, 7 and with a battery 3. The electrical contacts between the electrical circuit 4 and the first and second ultrasound transducers 6, 7 are in this embodiment established as follows. A first and a second elastic contact 24, 25 is put into contact with, in one end, the first and second ultrasound transducers, respectively, and, in the other end, the electrical circuit 4. Furthermore, a metal layer contact 26 established electrical contact between the bottom sides of said first and second ultrasound transducers 6, 7 and the electrical circuit 4. According to the present embodiment, the electrical circuit 4 fixated in a first connection part 28, in which a battery 3 supplying electrical power to the electrical circuit 4 may also be fixated. The first connection part 28 is connected to a second connection part 29, which together with a third connection part 30 sandwich a part of the first and second elastic contacts 24, 25. The third connection part 30 may then be connection to the meter housing body 32. Finally, the meter housing comprises a display 23 for showing e.g. consumption data, such as e.g. the instantaneous consumption rate, the accumulated consumption since the last read-out and/or the total lifetime accumulated consumption, or other data, such as meter identification number, production serial number etc. The display 23 is fixated to the meter housing body 32 by a display frame 27. The meter furthermore comprises a flow tube 20 defining a flow channel 5 as the hollow inner space of the flow tube 20. The flow tube 20 has a first tube end opening 37 in one end and a second tube end opening 38 in the opposite end. The fluid to be measured can then flow through the first tube opening 37, through the flow channel 5, and out through the second tube opening 38, or the opposite direction. Preferably, the flow tube 20 can be connected to existing piping system, thereby allowing the fluid to flow through the flow channel 5. The meter housing 2 can be connected to a fourth connection part 31 of said flow tube 20 by insertion of locking pins 11, which connects the bottom of the meter housing 2 with the fourth connection part of the flow tube 20. Finally, a flow channel insert 12, which may preferably be assembled from two mirror-symmetrical half-parts, may be inserted into the flow channel 5. The two half-parts may have insertion recesses for a first, second, and third ultrasound reflectors, so that when the two half-parts are assembled into the flow channel insert 12, the ultrasound reflectors are incorporated in this flow channel insert 12. The flow channel insert 12 may, prior to assembly of the meter housing 2 with the flow tube 20 by the locking pins 11, be inserted into the flow channel 5 in a position opposite or below the meter housing 2.

The transducer recesses 15, 16 of the meter housing 2 may be inserted into tube openings 21, 22 in the flow tube 20, and into insert openings 33, 34, which are formed in the flow channel insert 12, when the two half-parts of this flow channel insert 12 are assembled. Thereby, the positions of the flow tube 20 and the flow channel insert 12 relative to the meter housing 2 is fixated, at least the position in a direction parallel to a longitudinal axis 19 of the flow tube 20. The position of the meter housing 2 is finally fixated to the flow tube 20 by means of two locking pins 11. These locking pins 11 engage locking pin openings 39, which are positioned in the meter housing 2 as well as in a fourth connection part 31 of the flow tube 2. According to the present embodiment, the ends of the two locking pins 11 are adapted to engage each other and lock together. By means of said locking pins 11, the meter housing 2 is fixated to the flow tube 2. Furthermore, the transducer recesses 15, 16 fixate the flow tube 20 to the flow channel insert 12. Thereby, the parts of the ultrasonic flow meter 1 are fixated to each other.

Figure 4:
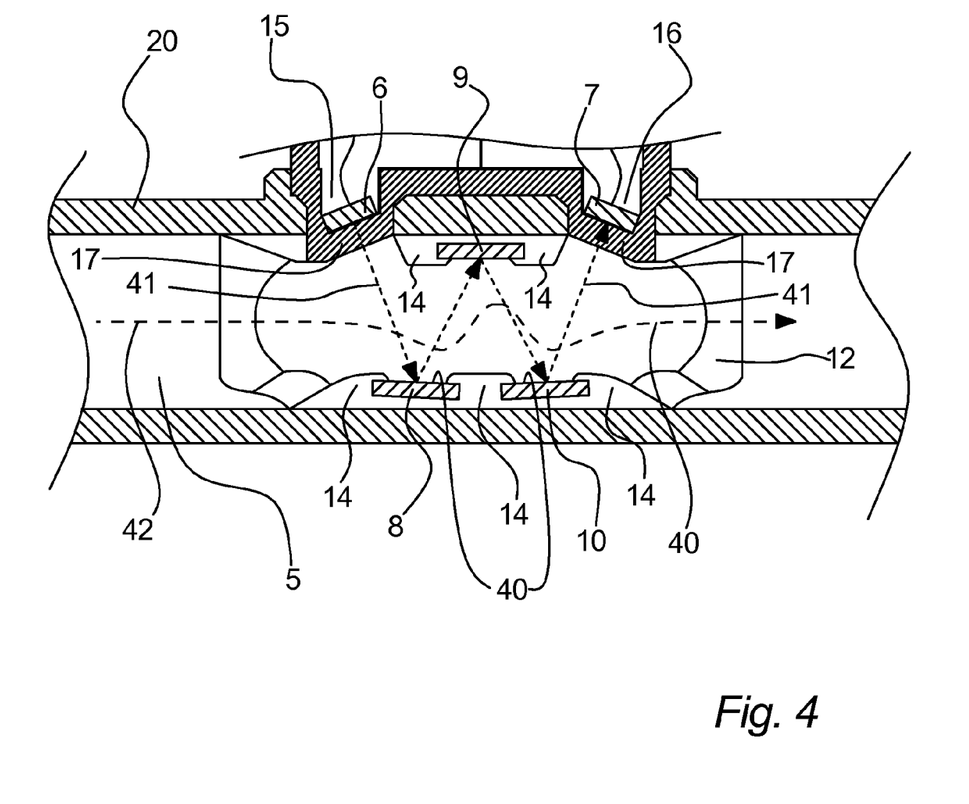
FIG. 4 illustrates the flow path and the path of an ultrasound signal according to an embodiment of the invention.

Now referring to FIG. 4, an embodiment of the invention is illustrated. A part of the ultrasonic flow meter 1 is shown, including the flow tube 20 defining a flow channel 5, a first and second transducer recess 15, 16, in which a first and second transducer 6, 7 is positioned, respectively. Furthermore, a flow channel insert 12, including a first, second, and a third ultrasound reflector 8, 9, 10, and guide elements 14, is shown. An ultrasound signal is emitted from the first ultrasound transducer 6 and reflected by the first, second, and third ultrasound reflectors 8, 9, 10 onto the second ultrasound transducer 7, where the ultrasound signal is detected and converted into an electrical signal. An ultrasound signal path 44 is shown from the first ultrasound transducer 6, via the ultrasound reflectors 8, 9, 10, and to the second ultrasound transducer 7. This ultrasound signal path 44 is of course to be understood as representing the directions of propagation of the ultrasound signal, but not as restricting the propagation of the ultrasound signal to the exact path line 44, since the actual path of course extends spatially around the path line 44. Also, a fluid flow line 42 is shown. This fluid flow line 42 illustrates the flow of the fluid medium through the flow channel 5. Here, the fluid flow line 42 is of course also to be understood as representing a direction of flow and not spatially restricting as the flow of course extends over the available inner of the flow tube 20. Since guide elements 14 extends into the flow channel 5 between the ultrasound reflectors 8, 9, 10, the fluid flow may be redirected or guided as illustrated by the fluid flow line 42. The actual extent of the effect of the guiding elements 14 may of course be very different than illustrated; typically the effect may be less significant. Also, it should be noted that the fluid flow line 42 is not left-right symmetric, but shifted towards the right of FIG. 4. This may be explained by the effect of the guide elements on the actual fluid flow being delayed or retarded. Due to change of fluid flow direction as induced by the guide elements 14, the interaction between the fluid and the ultrasound signal represented by path line 44 may be increased. This is due to the fact that the interaction between the flowing fluid and ultrasound signal is proportional to the path-integral between $$I \propto \int_S F(r) \cdot dr$$

where I is the interaction, F is a vector field representing the fluid flow, r is the spatial coordinate, and S defines the path of the ultrasound through the fluid between the two transducers 6, 7. Since an effect of the guide elements 14 on the fluid flow is that it is to a higher degree in the same direction as path of the ultrasound signal path 44, the dot-product $F(r) \cdot dr$ is increased, resulting in an increase in the interaction I. An increase in the interaction I may be advantageous since this caused the time difference $\Delta t$ between the transit-time back and forth to increase, which again results in a more accurate measurement result of the fluid flow velocity.

Figure 5A:
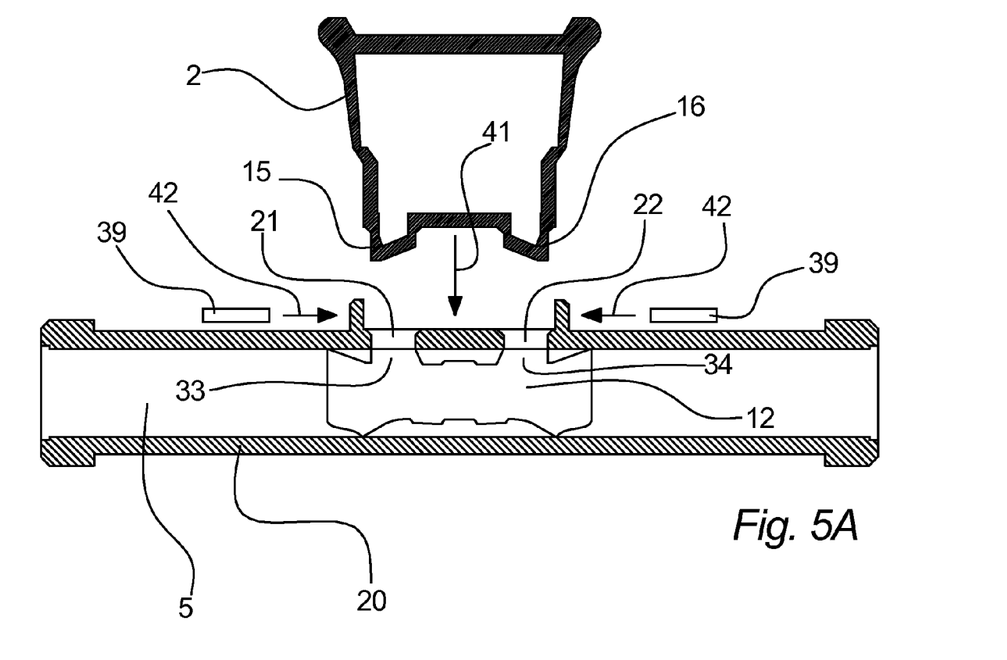
FIGS. 5A and 5B illustrates an ultrasonic flow meter and a method of assembling this according to an embodiment.
Figure 5B:
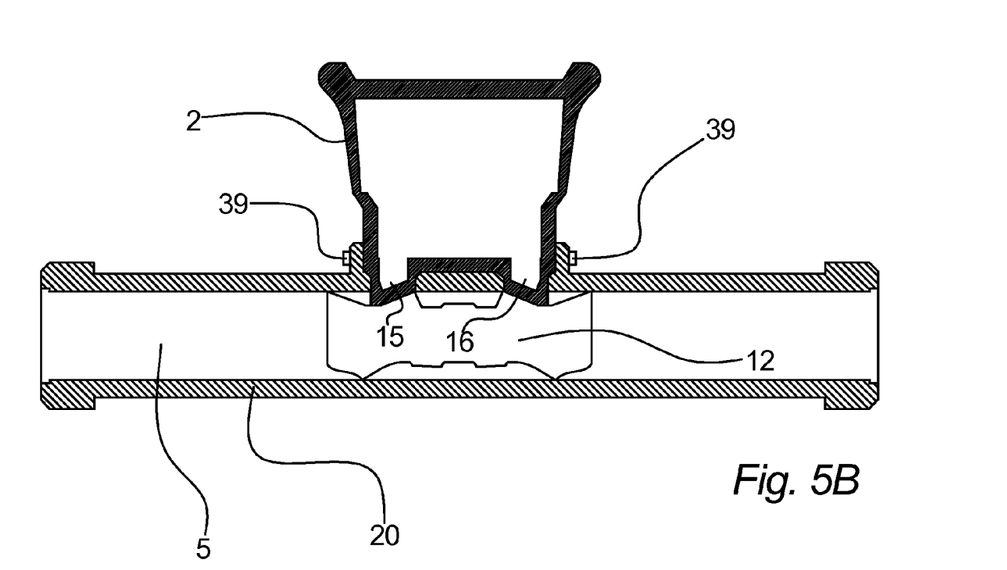

Referring to FIG. 5A and FIG. 5B, an embodiment of the invention is illustrated. On FIG. 5A an ultrasonic flow meter 1 comprising a flow tube 20, a meter housing, and a flow channel insert 12, is shown. These are shown without details, but it is to be understood that any elements of the above described embodiments may be present in the present embodiment. The flow channel insert 12 is positioned in the flow channel 5 of the flow tube 12, so that first and second insert openings 33, 34 are positioned opposite first and second tube openings 21, 22, respectively. Then, during assembly, the first and second transducer recesses 15, 16 are inserted into the first and second tube openings 21, 22, and, furthermore, at least partly into the first and second insert openings 33, 34 of the flow channel insert 12. Thereby, the position of the flow channel insert 12 is fixated relative to the flow tube 5. However, to fixate the meter housing 2 to the flow tube 20, different methods may be used. In one embodiment, locking pins 39 may be inserted through openings in a part of the flow tube 2 and into an opening in the meter housing 2, or vice versa. For instance, two locking pins 39 may be used by inserting them from opposite sides of the meter housing 2 and then connecting the two locking pins 39, e.g. by a ratchet-like connection. Furthermore, in an alternative embodiment, a protrusion of a locking pin may engage a recess of another locking pin, the meter housing 2, and/or the flow tube 20, or vice versa. Furthermore, in another alternative embodiment, a protrusion of a part of the meter housing, such as the transducer recess may engage a recess in the flow tube 20, such as in a tube opening 21, 22, or in the flow channel insert 12, such as in an insert opening 33, 34, or vice versa. When the meter housing is fixated to the flow tube 20 or to the flow channel insert 12, the flow tube 5, the meter housing 2 and the flow channel insert 12 are all three locked together or fixated, due to the flow tube 20 and the flow channel insert 12 being locked together upon insertion of the transducer recesses 15, 16 into the tube openings 21, 22.

Figure 6:
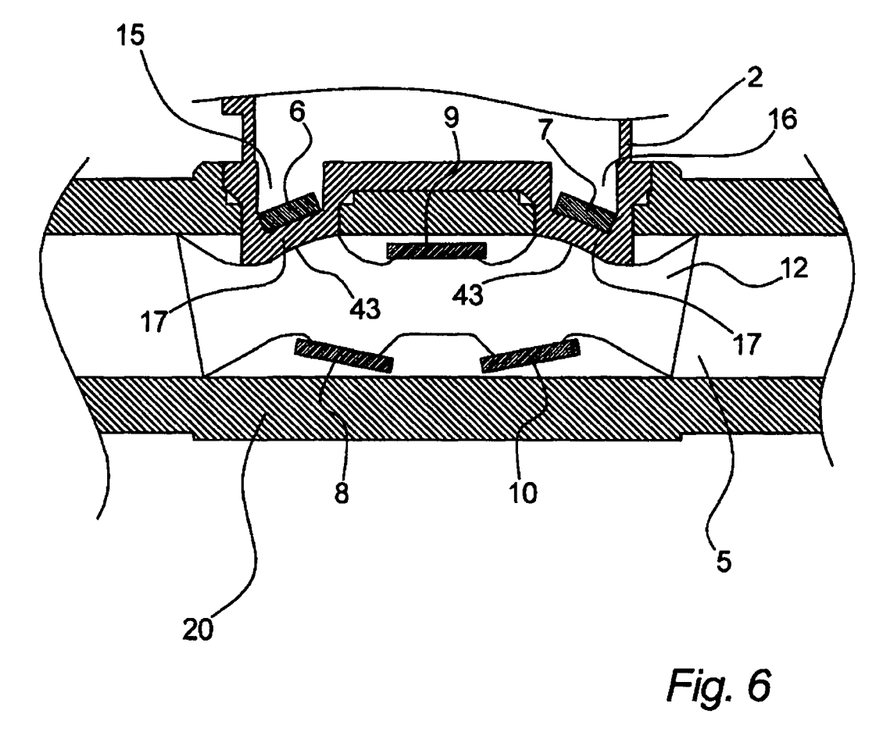
FIG. 6 illustrates a cross-sectional view of an ultrasonic flow meter with focusing transducers according to an embodiment.

Now, referring to FIG. 6, a cross-sectional view of a part of an ultrasonic flow meter 1 according to an embodiment of the invention is illustrated. The ultrasonic flow meter 1 comprises a flow tube 20 defining a flow channel 5 as an inner space, a meter housing 2, and a flow channel insert 12. The meter housing 2 comprises a first ultrasound transducer 6 in first transducer recess 15, and a second ultrasound transducer 7 in second transducer recess 16, both ultrasound transducers 6, 7 abutting the slanted bottom walls 17 of the respective transducer recesses 15, 16. The flow channel insert 12 comprises a first, a second, and a third ultrasound reflector 8, 9, 10. These ultrasound reflectors 8, 9, 10 are positioned and oriented so as to reflect an ultrasound signal from said first ultrasound transducer 6 to said second ultrasound transducer 7 and vice versa. As can be seen from FIG. 6, the slanted bottom walls 17 each have a focusing interface 43 between the meter housing 2 and the flow channel 5, here illustrated as a convex surface. The focusing effect may of course vary in different embodiments. Also, the focusing effect may in alternative embodiments be due to a focusing interface between the transducer and the slanted bottom wall, or as a combination of focusing interfaces. By focusing an emitted ultrasound signal, a greater part of this ultrasound signal may reach the receiving ultrasound transducer, thereby increasing the signal-to-noise ratio. Similarly, by focusing an ultrasound signal before the receiving transducer, the signal-to-noise ratio may be increased.

Figure 7A:
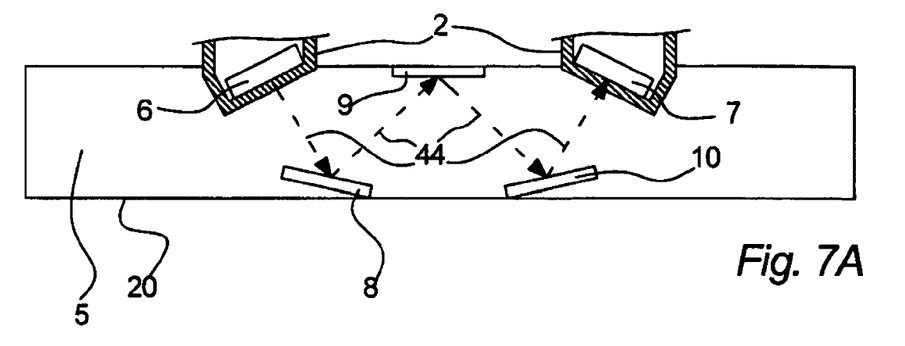
FIGS. 7A, 7B, and 7C show schematic illustrations ultrasonic flow meters with different flow tube diameters of according to an embodiment.
Figure 7B:
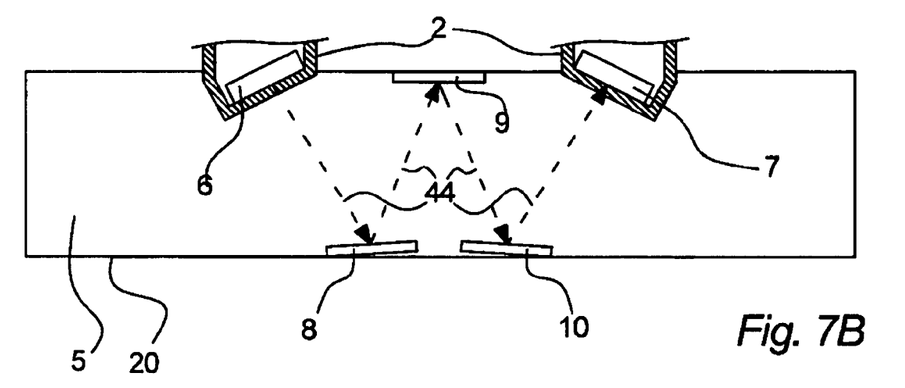
Figure 7C:
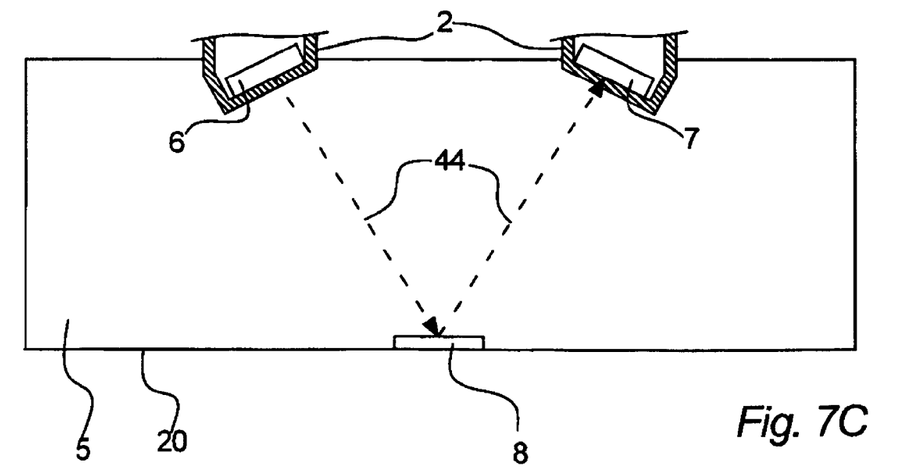

Referring to FIGS. 7A, 7B, and 7C, an embodiment of the invention is illustrated. Each of FIGS. 7A, 7B, and 7C illustrate a part of an ultrasonic flow meter, including a part of a meter housing 2, a flow tube 20 defining a flow channel 5, and one or more ultrasound reflectors 8, 9, 10. These ultrasound reflectors 8, 9, 10 reflect an ultrasound signal emitted from the first ultrasound transducer 6 onto the second ultrasound transducer 7. The path 44 of the ultrasound signal is illustrated. As can be seen from FIGS. 7A, 7B, and 7C, the same meter housing 2, including the same ultrasound transducers 6, 7 positioned and orientated identically in the meter housing 2, can be connected to a flow tube 20 of different diameter. However, the positions and/or orientations of the one or more ultrasound reflectors 8, 9, 10 can changed for different sizes or diameters of flow tubes 20. This illustrates an advantage of the invention in that the same meter housing 2 can be used for flow tubes 20 with different sizes or diameters. Furthermore, it is illustrated on FIG. 7C, only a signal ultrasound reflector 8 is shown, illustrating that this may be advantageous for larger sizes or diameters of flow tubes 20.

LIST OF REFERENCE NUMERALS

1. Ultrasonic flow meter
2. Meter housing
3. Battery
4. Electronic circuit
5. Flow channel
6. First ultrasound transducer
7. Second ultrasound transducer
8. First ultrasound reflector
9. Second ultrasound reflector
10. Third ultrasound reflector
11. Locking pin
12. Flow channel insert
14. Guide element
15. First transducer recess
16. Second transducer recess
17. Slanted bottom wall
18. Transducer recess longitudinal axis
19. Flow channel longitudinal axis
20. Flow tube
21. First tube opening
22. Second tube opening
23. Display
24. First elastic contact
25. Second elastic contact
26. Metal layer contact
27. Display frame
28. First connection part
29. Second connection part
30. Third connection part
31. Fourth connection part
32. Meter housing body
33. First insert opening
34. Second insert opening
35. Upper surface
36. Emitting surface
37. First tube end opening
38. Second tube end opening
39. Locking pin openings
40. Reflective surface
41. Inserting said first and second transducer recesses
42. Fluid flow line
43. Focusing interface
44. Ultrasound path
45. Inserting said locking pin

The invention claimed is:

1. An ultrasonic flow meter comprising
a meter housing,
a flow tube defining an inner flow channel for a fluid to be measured, and
a flow channel insert,
said flow channel insert comprising
one or more ultrasound reflectors fixated in said flow channel insert, and
a first and a second channel insert openings
said meter housing comprising
a first transducer recess,
a second transducer recess,
a first ultrasound transducer positioned in said first transducer recess,
a second ultrasound transducer positioned in said second transducer recess, and
an electronic circuit for operating said ultrasonic flow meter,
wherein said transducer recesses each has slanted bottom walls,
wherein said first and second ultrasound transducers are in abutment with said slanted bottom walls of said first and second transducer recess, respectively,
wherein said first and said second transducer recess extends into a first and a second flow tube opening in said flow tube, and into said first and second channel insert openings, respectfully.

2. The ultrasonic flow meter according to claim 1, wherein said ultrasound transducers are positioned inside said meter housing, and wherein at least one of said ultrasound transducers is configured for, during operation of said ultrasonic flow meter, to emit an ultrasound signal, said ultrasound signal propagating through said slanted bottom wall abutting said at least one ultrasound transducer, through said fluid in said flow channel, and said ultrasound signal being reflected by said one or more ultrasound reflectors, then propagating through said slanted bottom wall abutting the other ultrasound transducer receiving said ultrasound signal.

3. The ultrasonic flow meter according to claim 1, wherein a longitudinal axis of each elongated transducer recesses is orthogonal with respect to a longitudinal axis of the flow channel.

4. The ultrasonic flow meter according to claim 1, wherein the ultrasonic flow meter comprises a first, a second, and a third ultrasound reflector.

5. The ultrasonic flow meter according to claim 4, wherein reflective surfaces of the first and third ultrasound reflector are orientated such that these reflective surfaces have angle with respect to a longitudinal axis of the flow channel.

6. The ultrasonic flow meter according to claim 1, wherein said ultrasound transducers have a bottom side facing the bottom walls of the first and second transducer recesses, and wherein the meter housing comprise a metal layer contact being in electrical contact with the bottom sides of the ultrasound transducers and in electrical contact with the electronic circuit.

7. The ultrasonic flow meter according to claim 1, wherein each of the ultrasound transducers have an upper side connected to a first and a second elastic contact, respectively.

8. The ultrasonic flow meter according to claim 7, wherein the elastic contacts are curved metal strips.

9. The ultrasonic flow meter according to claim 1, wherein the ultrasound transducers are focused.

10. The ultrasonic flow meter according to claim 1, wherein said flow channel insert is assembled from two mirror-symmetrical half-parts, the assembled flow channel insert having a partition surface between the half-parts, said partition surface extending from the side of said flow tube facing said meter housing to the opposite side of said flow tube.

11. The ultrasonic flow meter according to claim 1, wherein the flow channel insert comprises guide elements for guiding the flow of the fluid.

12. The ultrasonic flow meter according to claim 11, wherein the guiding elements of the flow channel insert are adapted for extinguish ultrasound.

13. The ultrasonic flow meter according to claim 1, wherein the flow channel insert is fixated relative to the flow tube by the meter housing.

14. The ultrasonic flow meter according to claim 1, wherein one or more of the ultrasound reflectors are focusing.

15. The ultrasonic flow meter according to claim 1, wherein the meter housing is fixated relative to the flow tube by one or more locking pins.

16. The ultrasonic flow meter according to claim 1, wherein said first and second ultrasound transducers are oriented so as to emit an ultrasound signal in a direction being non-orthogonal to a longitudinal axis of the flow tube.

17. The ultrasonic flow meter according to claim 1, wherein said first and said second transducer recesses are in the form of hollow protrusions and extend through said first and said second tube opening in said flow tube and into said inner flow channel.

18. The ultrasonic flow meter according to claim 1, wherein the flow channel insert is, during assembly, inserted axially into the flow channel.

19. A method of assembling an ultrasonic flow meter
said ultrasonic flow meter comprising
a meter housing,
a flow tube defining an inner flow channel for a fluid to be measured, and
a flow channel insert,
said flow channel insert comprising
one or more ultrasound reflectors and
a first and a second insert opening,
said meter housing comprising
a first transducer recess,
a second transducer recess,
a first ultrasound transducer positioned in said first transducer recess,
a second ultrasound transducer positioned in said second transducer recess, and
an electronic circuit for operating said ultrasonic flow meter,
wherein said transducer recesses each has slanted bottom walls, and wherein said first and second ultrasound transducers are in abutment with said slanted bottom walls of said first and second transducer recess, respectively,
wherein the flow tube comprising a first tube opening and a second tube opening, said method comprising the steps of
inserting said flow channel insert into said flow channel,
inserting said first and second transducer recesses of the meter housing through said first and second tube openings and into said first and second insert openings, and
fixating said meter housing to said flow tube.

\* \* \* \* \*